Oct. 29, 1957     C. F. HAVELKA     2,811,597

AUTOMATIC SPEED REDUCING SIGNAL FOR MOTOR VEHICLES

Filed April 26, 1955

INVENTOR
CHARLES F. HAVELKA

BY
McMorrow, Berman + Davidson
ATTORNEYS

United States Patent Office 2,811,597
Patented Oct. 29, 1957

2,811,597

AUTOMATIC SPEED REDUCING SIGNAL FOR MOTOR VEHICLES

Charles F. Havelka, Champaign, Ill.

Application April 26, 1955, Serial No. 503,956

3 Claims. (Cl. 200—61.46)

This invention relates to motor vehicle signal devices, and more particularly to an improved automatic warning device for use on a motor vehicle to indicate to the operator of a following vehicle that the speed of the vehicle carrying the device is being reduced.

The main object of the invention is to provide a novel and improved speed warning signal device for a motor vehicle, said device being simple in construction, being easy to install on a motor vehicle, and providing a means for giving a warning to a following vehicle when the speed of the vehicle equipped with the device is reduced.

A further object of the invention is to provide an improved speed warning signal device for a motor vehicle, said device involving inexpensive components, being sturdy in construction, and being reliable in operation.

A still further object of the invention is to provide an improved motor vehicle speed warning signal device which provides a flashing signal when the speed of the vehicle is reduced, the device functioning automatically following acceleration of the vehicle.

Further objects and advantages of the invention will become apparent from the following description and claims, and from the accompanying drawings, wherein:

Figure 5:
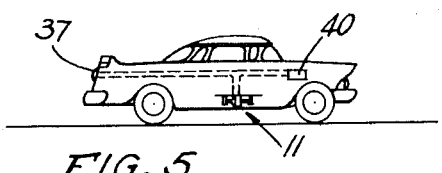
Figure 5 is a side elevational view of a vehicle equipped with an improved warning signal device according to the present invention.

Referring to the drawings, 11 generally designates the improved speed warning signal device, said signal device comprising a base 12 adapted to be mounted at a suitable location on the motor vehicle, for example, beneath the floor of the passenger compartment, as indicated in Figure 5. Secured on the base 12 are the respective opposite upstanding post elements 13 and 14, and journaled in the top portions of said post elements is the longitudinal shaft 15.

Freely journaled on the shaft 15 is the wheel member 16, said wheel member having the conical forward portion 17 and being formed at its rear portion with a recess 18, the recess having a generally spiral peripheral wall including the shoulder or abutment 19.

Figure 2:
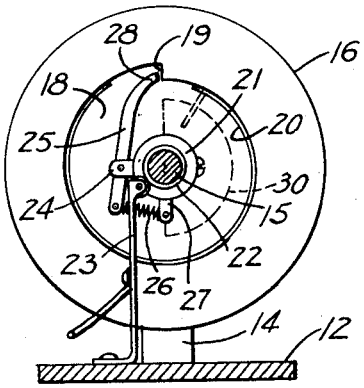
Figure 2 is a transverse vertical cross sectional view taken on the line 2—2 of Figure 1.
Figure 4:
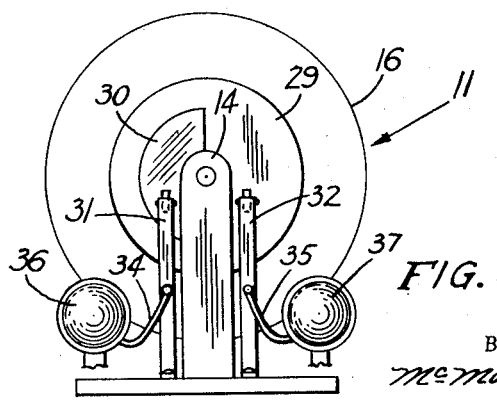
Figure 4 is a front end elevational view of the speed warning signal device of Figures 1 to 3.

Secured in the spiral wall of the recess 18 is the contact strip 20, said strip 20 being in the form of a metal band which is secured to the inside surface of the wall of recess 18 and extends around the shaft 15 in the manner shown in Figure 2. As shown in Figure 2, the ends of the band 20 are spaced substantial distances from the abutment shoulder 19.

Secured on the shaft 15 in the recess 18 is a collar 21 having a contact sleeve portion 22 which is engaged by a roller provided on the end of a resilient brush 23 secured to base 12, whereby the brush 23 is continuously in electrical contact with the sleeve 22 and collar 21. The collar 21 is formed with an outwardly projecting lug 24 to which is pivoted a dog element 25, said dog element being biased clockwise, as viewed in Figure 2 by a coiled spring 26 connected between the lower end of the dog element 25 and a lug 27 on the collar 21.

The dog element 25 has a curved end 28 which is engageable with the abutment shoulder 19, whereby the shaft 15 may be employed to drive the wheel 16 clockwise, as viewed in Figure 2, responsive to clockwise rotation of said shaft 15.

Figure 3:
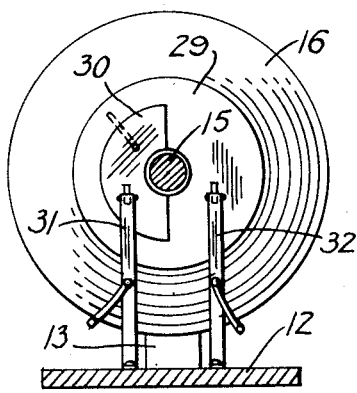
Figure 3 is a transverse vertical cross sectional view taken on the line 3—3 of Figure 1.

The wheel element 16 is provided with the front surface 29 and secured on said front surface is the semicircular metal plate 30 arranged concentric with the shaft 15, as shown in Figure 3. Secured to the base 12 are the pair of upstanding resilient brush elements 31 and 32 having contact rollers at their top ends which are alternately engageable with the metal plate 30 responsive to the rotation of the wheel element 16. The metal plate 30 is connected by a conductor 33 to the contact band 20.

Figure 1:
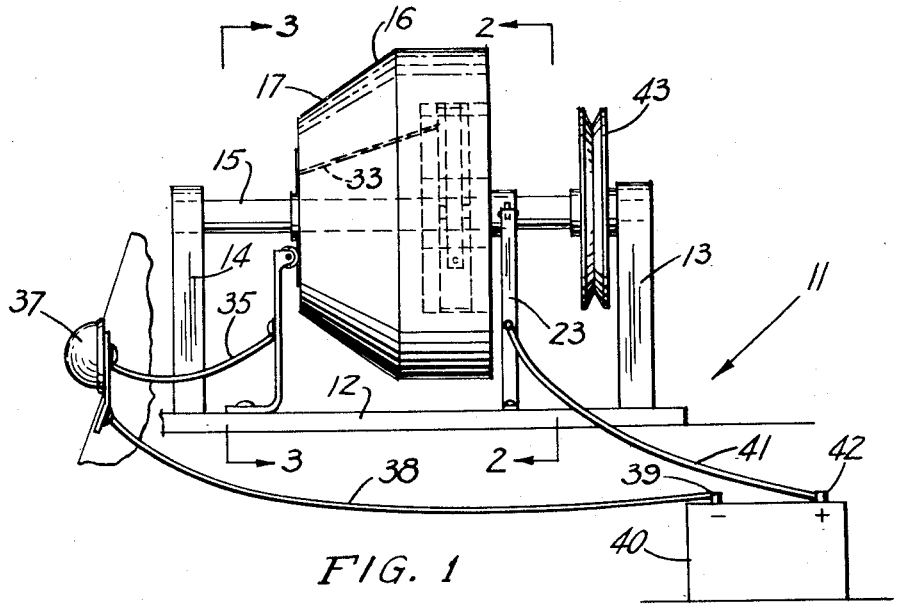
Figure 1 is a side elevational view of an improved speed warning signal device constructed in accordance with the present invention.

The respective brush members 31 and 32 are connected by suitable wires 34 and 35 to the respective signal lamps 36 and 37 mounted on the rear portion of the vehicle, the respective lamps being connected in circuit with the respective wires 34, 35 and additional wires 38 to the negative terminal 39 of the vehicle battery 40. The contact brush 23 is connected by a wire 41 to the positive terminal 42 of the battery 40, as shown in Figure 1.

Normally, namely, when the curved end portion 28 of the dog 25 is in abutment with the shoulder 19, the lamps 36 and 37 are deenergized. However, when the curved portion 28 of the dog element 25 engages the contact band 20, a circuit may be established between the battery 40 and one of the lamps 36 or 37, depending upon which brush 31 or 32 engages the contact plate 30.

The shaft 15 is provided with a pulley 43 which may be coupled in any suitable manner to the power source of the vehicle, for example, which may be connected by a belt to the vehicle propeller shaft. Normal rotation of the shaft 15 at ordinary speed without deceleration causes the dog element 25 to engage the shoulder 19 and to drive the wheel element 16 at the same speed as the shaft 15. When the vehicle speed is reduced, the wheel element 16 tends to overrun the shaft 15, whereby the curved portion 28 of the dog element 25 comes into contact with the contact band 20, establishing the warning signal circuit. Since the wheel element 16 is rotating, the semicircular contact plate 30 alternately engages the brushes 31 and 32, whereby the lamps 36 and 37 are intermittently energized in alternate sequence, providing a blinking signal which gives the operator of a following vehicle clear visual warning as to the reduction in speed of the vehicle.

While a specific embodiment of an improved speed reduction warning signal device for a vehicle has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a vehicle, a speed reduction warning switch device comprising a support, a shaft journaled on said support, said shaft being adapted to be connected to the power source of the vehicle, a wheel freely journaled on said shaft, a conductive dog element secured to said shaft, said wheel being formed with a generally spiral inner peripheral wall provided with an abutment shoulder drivingly engageable by said dog element, and a contact on said spiral inner wall engageable by said dog element when the wheel rotates faster than the shaft, whereby said switch device is closed when the wheel overruns the shaft.

2. In a vehicle, a speed reduction warning switch device comprising a support, a shaft journaled on said support, said shaft being adapted to be connected to the power source of the vehicle, a wheel freely journaled on said shaft, a conductive dog element secured to said shaft, said wheel being formed with a generally spiral inner peripheral wall provided with an abutment shoulder drivingly engageable by said dog element, a contact on said spiral inner wall engageable by said dog element when the wheel rotates faster than the shaft, a conductive brush mounted on said support, a contact plate on said wheel intermittently engageable by said brush responsive to rotation of said wheel, and circuit means connecting said brush, contact plate, dog element and contact in series, whereby said switch device is intermittently closed when the wheel overruns the shaft.

3. In a vehicle, a speed reduction warning switch comprising a support, a shaft journaled on said support, said shaft being adapted to be connected to the power source of the vehicle, a wheel freely journaled on said shaft, a source of current, a conductive dog element secured to said shaft, said wheel being formed with a generally spiral inner peripheral wall provided with an abutment shoulder drivingly engageable by said dog element, a contact band mounted on said spiral inner wall and extending around said shaft in the plane of said abutment shoulder, the ends of the band being spaced from said abutment shoulder, said contact band being arranged so as to be engaged by said dog element when the wheel rotates faster than the shaft, a conductive brush mounted on said support, a contact plate on said wheel intermittently engageable by said brush responsive to rotation of said wheel, and circuit means connecting said brush, contact plate, dog element and contact band in series, whereby said switch is intermittently closed when the wheel overruns the shaft.

References Cited in the file of this patent
UNITED STATES PATENTS

| | | |
|---|---|---|
| 1,311,135 | Olds | July 22, 1919 |
| 1,652,449 | Miller | Dec. 13, 1927 |
| 1,682,098 | Sonnek | Aug. 28, 1928 |
| 1,897,074 | Rees | Feb. 14, 1933 |
| 2,069,272 | Richards | Feb. 2, 1937 |
| 2,574,616 | Brown | Nov. 13, 1951 |